Dec. 28, 1943.  H. A. HULSBERG  2,337,608
LIQUID LEVEL INDICATOR
Filed April 18, 1942
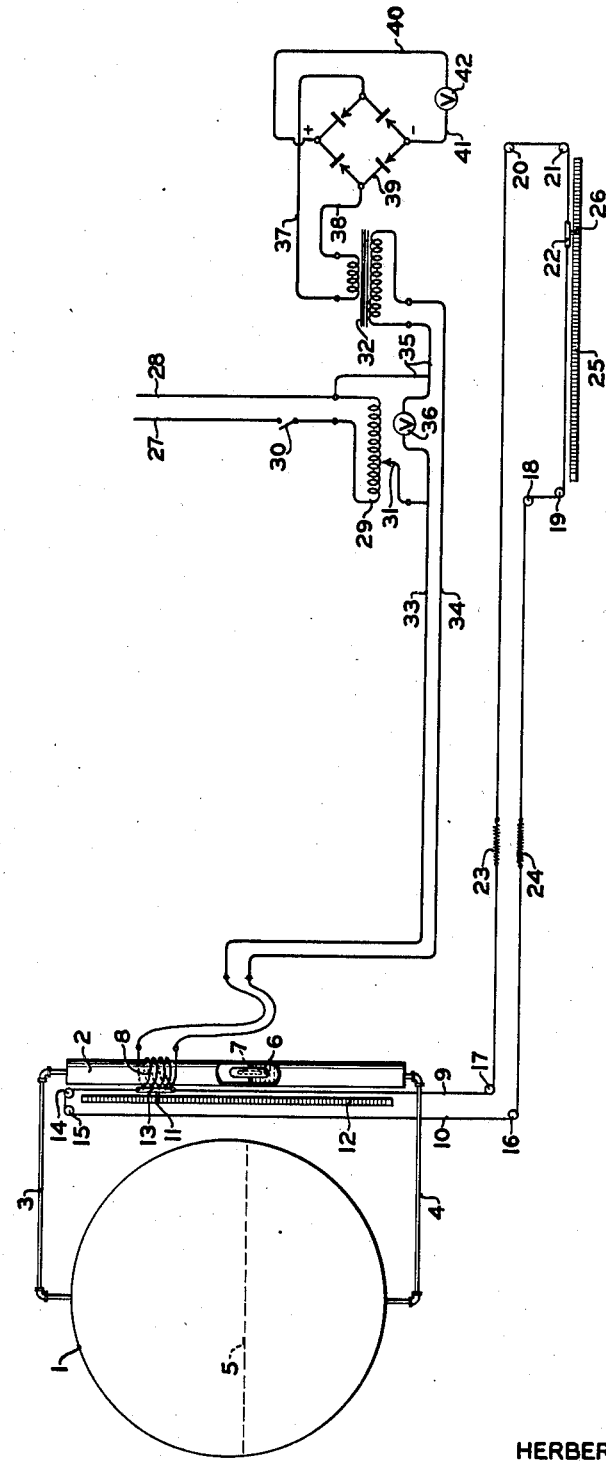
INVENTOR
HERBERT A. HULSBERG
BY
ATTORNEY Patented Dec. 28, 1943

2,337,608

UNITED STATES PATENT OFFICE 2,337,608

LIQUID LEVEL INDICATOR

Herbert A. Hulsberg, Chicago, Ill., assignor to Universal Oil Products Company, Chicago, Ill., a corporation of Delaware Application April 18, 1942, Serial No. 439,587

5 Claims. (Cl. 73—313)

The invention relates to an improved form of liquid level indicating device and more particularly to a type of apparatus which is especially suited for use in connection with equipment employed in handling extremely corrosive materials.

The features of this invention make it advantageous for employment in processes such as those in which iso-paraffin hydrocarbon compounds are alkylated with olefin hydrocarbons utilizing hydrogen fluoride as a catalyst. It is well known that hydrogen fluoride is very corrosive as regards a great many materials and can cause serious injury to any person coming in contact therewith. It is highly important, when contemplating the construction of apparatus for use with hydrogen fluoride that any possibility of leakage is eliminated in order to protect the safety of the operators or any other persons who might enter the vicinity of the equipment. The difficulties which might have been encountered in designing equipment for handling hydrogen fluoride are further amplified by the presence of hydrocarbon compounds, as occurs in the above mentioned process for the alkylation of iso-paraffins with olefins.

The combination of hydrogen fluoride with hydrocarbon compounds results in very corrosive mixtures which attack, not only ordinary metals and alloys but also materials which resist many other types of corrosive action, such as silica-containing materials including glass, and rubber compounds. This makes the use of visual indicators such as gauge glasses out of the question because of the corrosive effect of hydrofluoric acid on silica compounds. Mechanical float operated indicators employing stuffing boxes are also not suitable for use because of the lack of satisfactory packing materials. Mechanical float operated indicators employing torsion tubes and the like, as means for eliminating stuffing boxes, are not practical because of the danger of corrosion to the extremely thin sections of metal necessary to make the torsion tubes operable.

The present invention utilizes the well known fact that the impedance of an induction coil will vary directly as its proximity to iron is changed. For instance, when no iron is present the impedance of a coil will have a certain value which will increase as iron is brought closer to it until a maximum value is reached when the iron is centrally located within the coil.

The impedance value of a coil governs its resistance to the flow of electricity therethrough. Therefore, the higher the impedance value of a coil the greater will be the voltage drop in an electric current flowing therethrough.

Heretofore, various methods have been disclosed employing the above principle in liquid level indicating and controlling devices. My invention, however, differs from known prior art in that the induction coil is employed as an exploratory coil. Previously disclosed apparatus of this class employ fixed or stationary coils and depend entirely upon the displacement of a float-supported piece of iron within the coil. A calibrated meter or light connected in series with the induction coil and a source of alternating current will indicate changes in the liquid level by indicating the change in the impedance of the induction coil. This method will render a fairly accurate measurement of the liquid level as long as a current supply of constant voltage is available; any deviations in the input voltage, however, will cause the device to yield erroneous indications of the liquid level.

Other apparatus, heretofore disclosed as suitable for use in indicating liquid levels in vessels handling corrosive materials employ floating magnets which attract external compass needles, thereby indicating the level. These devices, however, are of limited application, their use being confined to installations where remote readings are not necessary.

The features of my invention provide means for accurately locating liquid levels, either at a local point or at some remote station or in both places and is independent of variations in the voltage of the alternating current supply, because the liquid level measurements are based upon the point of minimum deflection of a voltmeter and not upon the degree of deflection.

The features and advantages of the invention will be more apparent with reference to the accompanying schematic drawing and the following description thereof. The drawing illustrates one specific form of apparatus embodying the features of the invention.

In the drawing the numeral 1 denotes a vessel in which the location of the liquid level is desired. A float chamber or cage 2, constructed of a suitable non-magnetic material such as stainless steel is of sufficient size to allow a float to freely move in a vertical direction therein. The float chamber is in communication with the vessel 1 by means of conduits 3 and 4 which are connected to the vessel above and below the normal range of the liquid level which level is here shown by the dotted line 5. The level shown at 5 may be the liquid level line between a liquid and a vapor or gas or it may be the interface liquid level between two immiscible liquids of different specific gravities. A suitable float 6, designed to float at the level indicated by line 5 and of sufficient size to support a mass of iron 7, is free to move in the chamber 2, with changes of the liquid level in vessel 1. This float may be made of stainless steel or other suitable corrosion resistant, non-magnetic material. Closely adjacent and circumscribing the chamber 2 is an inductance coil 8, which in the case here illustrated is movably supported by means of a supporting member 13 and cables 9 and 10 which are of a non-magnetic material such as copper, stainless steel, aluminum, or other suitable substance. The coil 8 may be secured to the member 13 by means such as a loop or band not shown and the cables 9 and 10 may be secured to the member 13 by means of holes in said member through which the end of the cables may be passed and fastened.

The calibrated scale 12 is provided to furnish means for determining the liquid level in the vessel 5, the pointer 11, secured to the member 13, acting as an index of said level as will hereinafter be described.

The cables 9 and 10 pass over suitable pulleys 14, 15, 16, 17, 18, 19, 20, and 21, and have their opposite ends secured to the member 13 by means of holes therein. Suitable tension equalizing springs 23 and 24 may be interposed in cables 9 and 10 respectively. The calibrated scale 25 cooperating with the pointer 26 secured to the member 22 will indicate the location of the coil 8 with respect to the vessel 1 and indicate the level of liquid therein as will be hereinafter explained. When desired, the cables 9 and 10, the scale 25 and pointer 26 with their cooperating pulleys may be eliminated and only the scale 12 and pointer 11 utilized for indicating the liquid level in vessel 1.

An alternating current from a suitable source is introduced to the electrical circuit of the apparatus by means of conductors 27 and 28 which are connected to the coil 29 of a variable auto-transformer. A suitable switch 30 may be interposed in line 27 to furnish means for disconnecting the apparatus from the source of electrical current. The output of the auto-transformer is variable by means of the adjustable contactor 31 and is connected in series with the coil 8 and the primary coil of a step down transformer 32 by means of the conductors 33, 34, and 35. A suitable voltmeter 36 is connected across the output of the auto-transformer to provide means for ascertaining the output voltage therefrom. The secondary coil of transformer 32 is connected by means of conductors 37 and 38 to a bridge type rectifier 39. A mercury arc "Tungar" or other suitable rectifier may be employed in place of the bridge type illustrated, when desired. The output is connected by means of conduits 40 and 41 to a suitable direct current voltmeter 42. It is entirely within the scope of the invention to employ an alternating current voltage indicator across the secondary coil of transformer 32 when desired and eliminate the rectifier and direct current voltmeter. More stable readings, however, will be obtainable when employing the rectifier and direct current voltmeter.

The operation of the apparatus in determining the liquid level in vessel 1 is as follows: The switch 30 is closed and the auto-transformer adjusted for a suitable output voltage by means of the contactor 31. Then the coil 8 is operated by means of the connecting cables 9 and 10 and the member 22 in an exploratory capacity until the voltmeter 42 responds in a definite manner. The voltmeter 42 will ordinarily have a fixed reading until the coil 8 becomes close to the float supported iron 7 when the voltage reading will sharply drop to a minimum point and as the coil again leaves the vicinity of the iron the voltage reading will again assume the previous value. Therefore the location of the iron and consequently the float and liquid level may be noted on the calibrated scale 25 at the point where a minimum reading is obtained on voltmeter 42. The scales 25 and 12 are both calibrated to give identical readings which makes it possible for the operator to find the level at either point, as long as the voltmeter 42 is visible, or when desired a second voltmeter may be connected in parallel with voltmeter 42 and placed at a point readily visible adjacent the scale 12.

When desired the remote station at scale 25 may be eliminated and all liquid level readings obtained from the scale 12.

I claim as my invention:

1. A liquid level indicator comprising in combination a non-magnetic vertically elongated float chamber in communication with a vessel, a float supporting a mass of iron free to move longitudinally within said float chamber, an induction coil circumscribing said chamber and free to move longitudinally thereof, means connecting said induction coil with a source of alternating electric current, means indicating changes in the impedance of said coil as its spaced relationship with said mass of iron changes, and means for positioning said coil at the point of maximum impedance.

2. A liquid level indicator comprising in combination a non-magnetic vertically elongated float chamber in communication with a vessel, a float supporting a mass of iron free to move longitudinally within said float chamber, an induction coil circumscribing said chamber and free to be moved longitudinally thereof, means electrically connecting said induction coil to a source of alternating electric current, means indicating variations in the impedance of said coil as its spaced relationship with said mass of iron changes, and means mechanically connecting said coil to a remote control and indicating station so that said coil may be positioned at the point of maximum impedance.

3. A liquid level indicator comprising in combination a non-magnetic vertically elongated float chamber in communication with a vessel, a float supporting a mass of iron free to move longitudinally within said float chamber, an induction coil circumscribing said chamber and freely movable longitudinally thereof, means electrically connecting said coil to a source of alternating electric current, means indicating variations in the impedance of said coil as its spaced relationship with said mass of iron changes, a substantially continuous movable cable extending from adjacent said float chamber to a point adjacent said indicating means, and movable with said coil being attached to said cable, and pulleys supporting said cable whereby the displacement of any point in said cable will be transmitted in a like degree to all other points in said cable.

4. A liquid level indicator such as defined in claim 1 provided with means, comprising a variable auto-transformer, for regulating the voltage of said source of alternating electric current.

5. A liquid level indicator such as defined in claim 1 wherein the means indicating variations in the impedance of said induction coil comprise a step-down transformer, the primary coil of which is connected in series with said source of alternating electric current and said induction coil, and means for measuring the output voltage of the secondary coil of said step-down transformer.

HERBERT A. HULSBERG.